Nov. 1, 1966   F. E. LEIB ETAL   3,281,918
CONTINUOUS CLADDING SYSTEM FOR BIMETALLIC ROD
Filed Jan. 26, 1965   4 Sheets-Sheet 1

INVENTORS
Francis E. Leib &
John G. Kura

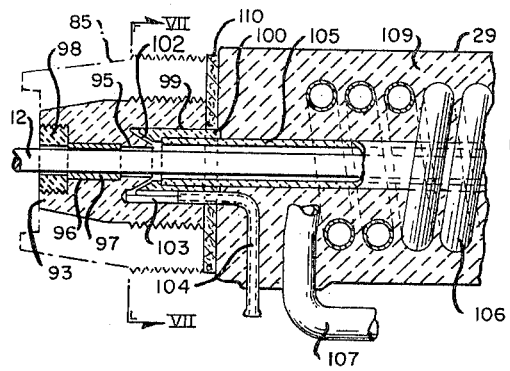
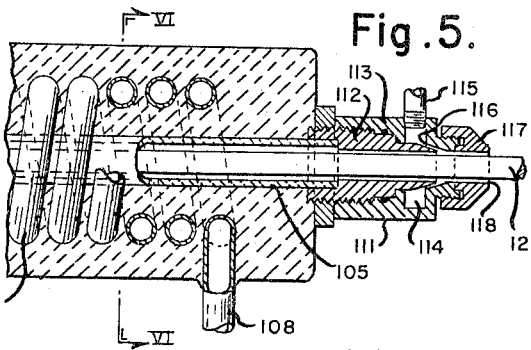
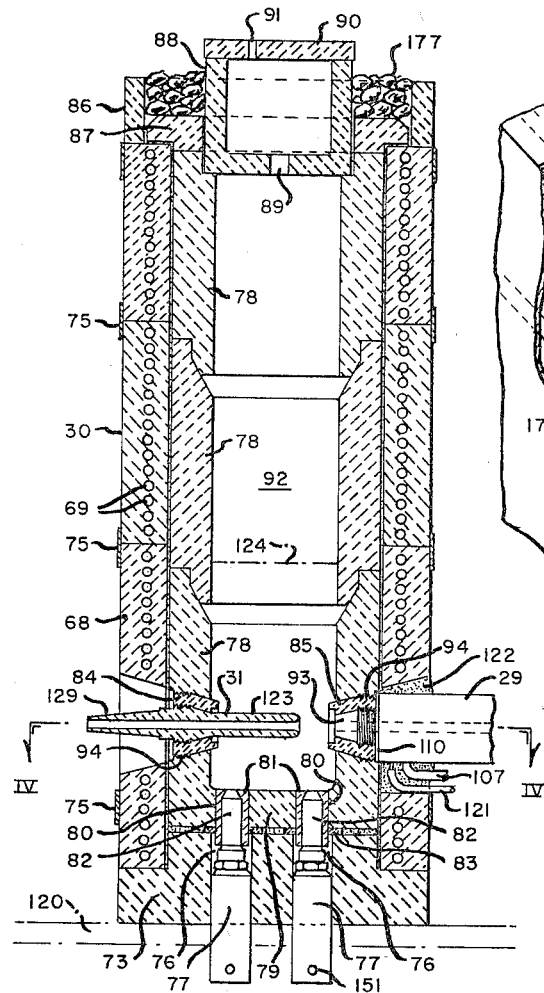
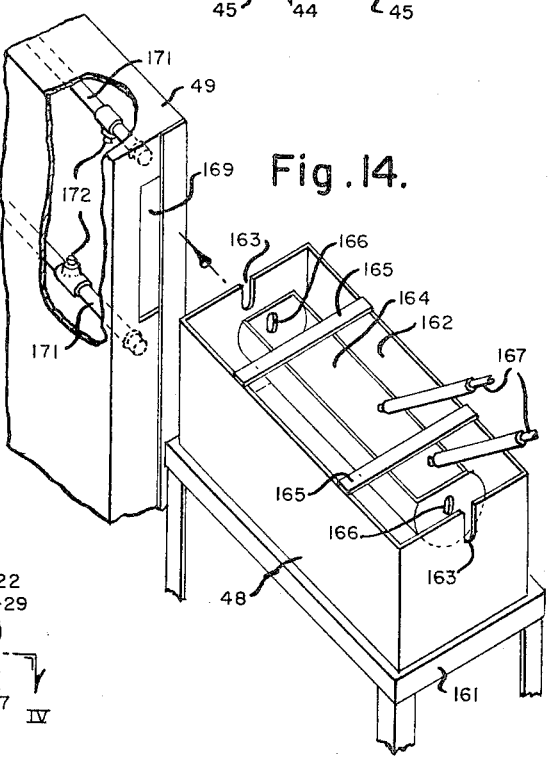

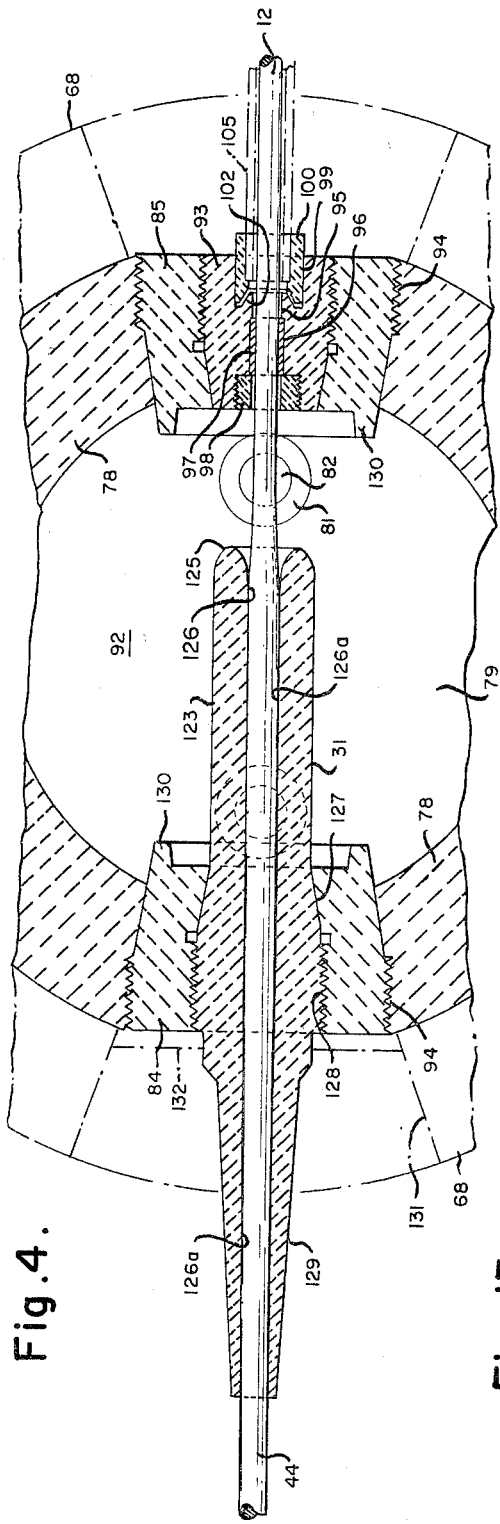

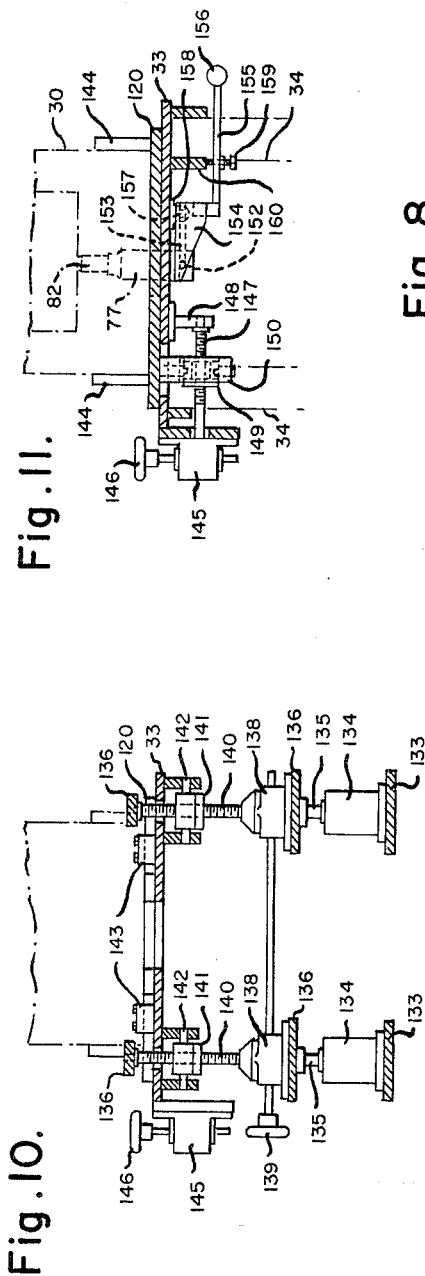
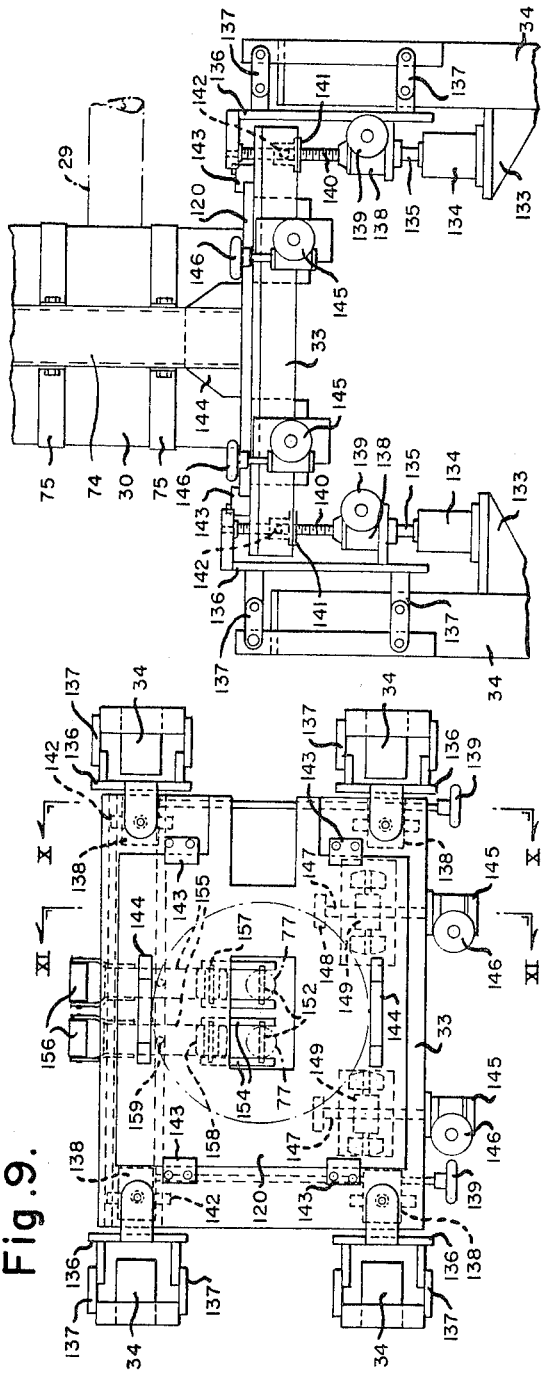

United States Patent Office 3,281,918
Patented Nov. 1, 1966

3,281,918
CONTINUOUS CLADDING SYSTEM
FOR BIMETALLIC ROD
Francis E. Leib, Pittsburgh, Pa., and John G. Kura, Columbus, Ohio, assignors, by direct and mesne assignments, to Copperweld Steel Company, Pittsburgh, Pa., a corporation of Pennsylvania
Filed Jan. 26, 1965, Ser. No. 428,051
24 Claims. (Cl. 29—33)

This invention relates to the continuous cladding of a preformed higher melting point metal core rod using molten cladding metal of a lower melting point to provide a bimetallic clad rod. More particularly, this invention relates to process and apparatus wherein a predetermined thickness of a cladding layer of copper is directly applied concentrically in molten state to a heated clean steel core to yield a copper-clad steel core rod of commercial value with diffusion bonding between cladding and core. As used herein, the term "rod" includes larger "wire" sizes, the metals named include their alloys and the cladding metal may be a lower melting point alloy of the core metal.

In a current production manufacture of copper-clad steel rod, round steel billets are preheated to a temperature of about 2000° F. and placed on end in preheated graphite-lined molds into which molten electrolytic copper then is poured. Upon solidification, the composite billet is removed from the mold, reheated to about 1800° F. and reduced by a series of hot reduction rolling mills to produce a composite rod with a copper-cladding bonded to a steel core. The economics of such manufacture are costly, the operation is a batch operation and the composite clad rod product is subject to, among other things, variation from batch to batch. Relative difficulty is encountered in obtaining uniform diameter and concentricity of cladding and core, there is a relative lack of control and regulation of the extent of diffusion of the ferrous metal into the copper-cladding adjoining the interface, work hardening is developed by the hot rolling limiting the steel which may successfully be used to a very few grades, opportunities for an occurrence detrimental to the clad rod undergoing manufacture are multiplied, and, practical limitations exist as to the size of coils of composite clad rod that can be produced. Usually, such composite rod is then die-drawn cold through conventional dies to produce the desired wire size thereof; such die-drawing often being done by the purchasers of the clad rod. The composite clad rod and its derivative die-drawn wire products in turn are usually utilized for electrical and/or mechanical goods of all kinds. Such composite electrical goods normally are used for single, plural and stranded electrical conductors, ground rods and other electrical goods including such as meet the standard specifications for hard-drawn copper covered steel wire set forth in ASTM Designation: B227–57. Such composite electrical goods in the case of copper-clad steel wire and strand are highly desirable because of their qualities of strength, high electrical conductivity and corrosion resistance. Mechanical uses include guy and messenger wires, fencing and levee mesh desirable principally because of strength, appearance and/or corrosion resistance.

Difficulties and deficiencies pointed out in the foregoing, may be overcome by practices of this invention. Therein, in the hereinbelow described embodiment, the manufacture, for example, of copper-clad steel core rod can be relatively continuous to directly produce the desired clad rod in the desired size. Apparatus of this invention preferably is arranged in a horizontal line even though the cladding layer metal is molten at the instant of contact with the horizontally moving preformed metal core. Process and apparatus of this invention enable such clad rod product to be made more quickly and inexpensively, gives closer control on the depth of diffusion bonding between the cladding layer and core when desired if the bimetallic product is to be used to conduct electricity, avoids any need for reduction or other pressure rolling, avoids the problems of obtaining concentricity present in the prior rolling practice, enables coils of any size to be made, allows the clad rod product of this invention to be utilized in all uses therefor, avoids the need for the use of any bonding agent between core and cladding layer despite the extremely short time of formation of cladding layer and allows a wide range of metals to be utilized. Such clad rod product of this invention has a solid cladding layer which is bonded over the entire interface between cladding layer and core, and the cladding layer itself is coherent, concentric about the core and consolidated without pinholes, inclusions, or gas holes, to any material or detrimental extent. Moreover, a practice of this invention yields such clad rod product in finished form for use in the as produced size, or, if desired, for die-drawing cold by conventional dies to provide such reduced sizes as may be desired. Further, a practice of this invention is flexible in that for a given diameter of clad rod product of this invention, the core size may be varied and the material either of the cladding layer or core may be changed readily. Other sizes of clad rod product may be produced by simple changes in the system.

Other objects, features and advantages of this invention will be apparent from the following description and the accompanying drawings, which are illustrative only, in which FIGURE 1 is a representative view in side elevation, partly foreshortened, of a feasibility demonstration apparatus embodiment of one practice of this invention;

FIGURE 3 is a detailed view in vertical section of a cladding furnace and associated parts utilizable in the aforesaid practice;

FIGURE 4 is a still larger detail view in plan taken generally along line IV—IV of FIGURE 3 to more fully show the entry guide and sizing die members and their mountings in the cladding furnace;

FIGURE 5 is an enlarged view in vertical section of an induction heater subassembly utilizable in the aforesaid practice;

FIGURE 6 is a view in cross section of the heater itself taken along line VI—VI of FIGURES 5;

FIGURE 7 is a view in cross section through the entry guide taken along line VII—VII of FIGURE 5;

FIGURE 8 is a view in side elevation of the lower portion of the cladding furnace and the upper portion of the supporting table with adjustment and indicating means thereon;

FIGURE 9 is a plan view of the table shown in FIGURE 8 with the cladding furnace removed;

FIGURE 10 is a view in end elevation and section taken along line X—X of FIGURE 9;

FIGURE 11 is a transverse elevational view in cross section taken along line XI—XI of FIGURE 9;

FIGURE 12 is a partial view of a horizontal pair of pulling rollers gripping a clad rod, such view being taken generally in the direction of line XII—XII of FIGURE 2;

FIGURE 13 is a plan view of the pulling device having such horizontal pulling rollers; and FIGURE 14 is a perspective view of quench apparatus along the apparatus line which may be utilized for a clad rod produced by the embodiment illustrated in FIGURE 1.

Figure 1:
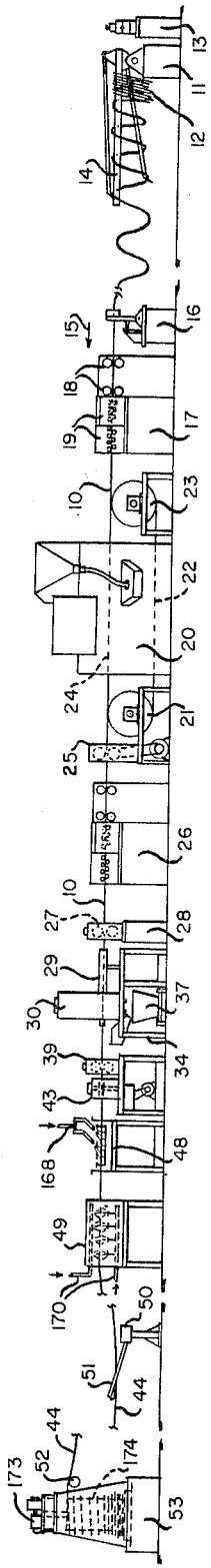
Figure 2:
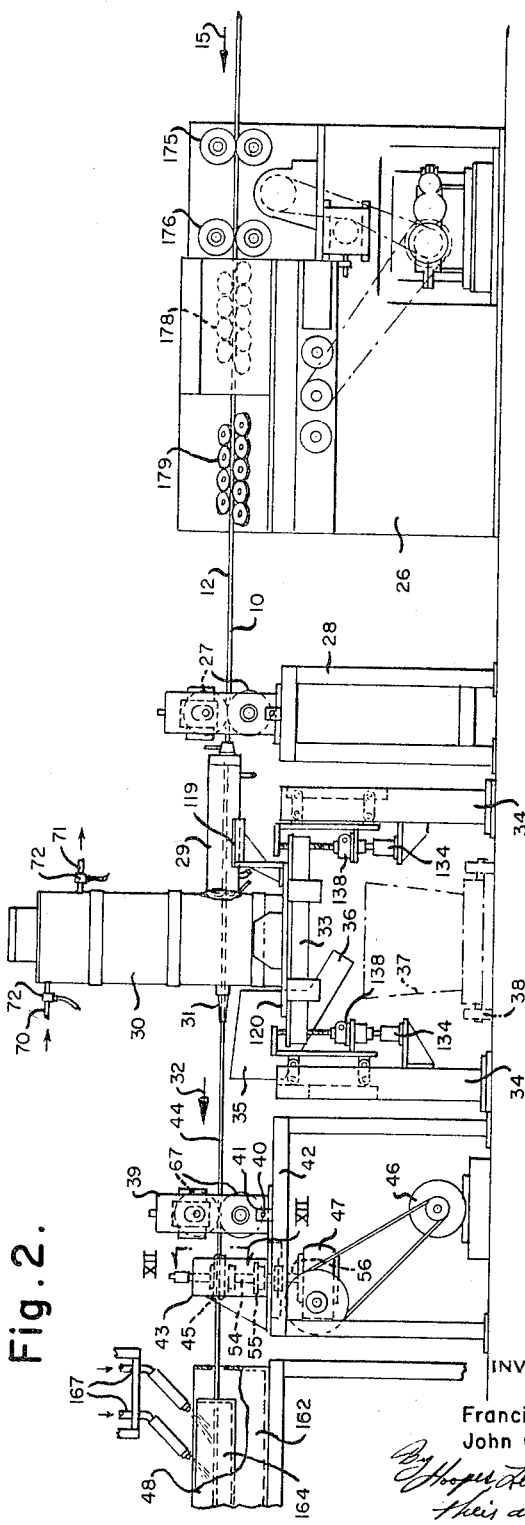
FIGURE 2 is a view in side elevation on a somewhat larger scale of the intermediate section of the embodiment shown in FIGURE 1.

Referring to the drawings, particularly to FIGURES 1 and 2, a feasibility demonstration apparatus is illustrated therein to make bimetallic clad rod from a selected diameter of preformed core rod of a higher melting point metal and a concentric cladding layer, initially in molten condition, of a lower melting point metal which is applied molten and solidified to a predetermined thickness with a diffusion bond therebetween.

Such apparatus as shown has a preparatory section which comprises a number of items of equipment along a generally horizontal passline 10. Thus, the preparatory section includes a pair of flipper pay-out stands 11, one to each side of the passline for respective coils of core rod 12. An electric abutment welder 13 is positioned adjacent such stands midway of the space between them so that the last turn of the coil or coils on stand 11 being paid out at the time being may be welded to the first turn of the coils on the flipper arm 14 of the other of the stands 11, thereby providing, in effect, a continuous coil of such core rod. Upon such welding, the resultant flash surrounding the weld is ground off or otherwise trimmed off, care being taken not to reduce the core rod diameter in that location by such grinding or trimming. Preferably, too, such coils of core rod are hot rolled rod in the case of steel, which has been passed through a rounding die before being placed on the respective flipper arm 14, to provide a relatively truly round cross section to move along the passline in the direction of arrow 15.

Such preparatory section may include a "snarl" switch 16 to shut down the apparatus at least locally if a kink or snarl, which cannot be handled by a multiplane roller straightener 17, should attempt to pass by the upright movable arm of switch 16. Straightener 17 as shown is provided with pairs of pinch rolls 18 to continuously pull core rod off the active pay-out stand 11 and pass it endwise through straightening roller banks 19 which, as shown, are respectively in 45° and 135° planes intersecting at passline 10. From straightener 17 the core rod passes through a grit blaster 20 and may be led around a sheave 21, back across a lower reach 22 and around a further sheave 23 before again passing through blaster 20 in cases where multiple passes of the core rod are desired to obtain the desired extent of cleaning in blaster 20. Preferably, the core rod makes at least two passes across upper reach 24 in blaster 20 before resuming its movement along single passline 10 toward a stand 25 for motor driven pinch rolls, such pinch rolls being used in starting up and inactive during normal operation. Of course, where there is more than one pass of core rod 12 in upper reach 24, passline 10 following blaster 20 will be laterally offset by a corresponding amount from passline 10 entering such blaster.

The feasibility demonstration apparatus illustrated in the drawings has an intermediate section which immediately follows the preparatory section and through which passline 10 passes. Such intermediate section comprises a second straightener 26 so that the cleaned core rod exiting therefrom is precisely straight with the axis of such core rod normally being able to be maintained within .005 of an inch of the straight theoretical passline. The moving rod at least in the intermediate section is preferably level as well as superstraight. Such precision straightness may be promoted by the use of vertical grooved entry rollers 27 in a housing on a stand 28, the grooves being generally V-shaped and the rolls separated a small distance by the core rod when in operation so that there is line engagement between each roller and the cleaned core rod. The upper roller is spring pressed downwardly against the clad rod, whereas the lower roller is fixed in precisely aligned position. Exceptional care also is taken from the instant the cleaned core rod leaves blaster 20 to avoid any lubricant, oil or dirt from engaging the surface of such cleaned core rod even though no hood, or protective atmosphere (except in heater 29) is required for steel core rod moving along passline 10.

An induction heater 29 and a cladding furnace 30 in the intermediate section are next encountered by the cleaned core rod moving along passline 10. The cleaned core rod is heated in heater 29, further heated and clad in furnace 30. The clad rod product comprising a concentric solid coherent cladding layer diffusion bonded to the cleaned core rod exits from a sizing die 31 still moving in the direction 32 along the passline 10.

The cladding furnace with its associated items is mounted on an adjustable table 33 supported in turn by a stand 34. A drain box 35 is positioned beneath the exit end of die 31 and has a runner 36 which is over a refractory drain receptacle 37 mounted on wheels 38, for use in case molten cladding metal should escape through die 31 during a preliminary or shutdown phase, or an improper operation. The clad rod 44 exiting from die 31 is hot approaching in the case of a copper-clad steel core a temperature upwards of 1800° F. as it leaves the sizing die 31. Downstream of the sizing die there is a vertical roller guide 39 in a housing with grooved rollers relieved on the side and having contours like those shown in FIGURE 12 except that the plane of the rollers in item 39 is vertical. Further, roller guide 39 (and 27) is adjustable vertically by shimming and transversely by transverse position screws 40 outboard of the guide housing to each side, each screw 40 engaging a threaded hole in a bracket 41 fixed to a stand 42 to which the housing of guide 39 is bolted.

A torque-controlled pulling device 43 is also mounted on stand 42 and has a pair of horizontal rollers 45 which grip relatively hot clad rod 44 as shown in FIGURE 13. Such horizontal rollers 45 are driven by a torque-controlling motor 46 through a gear box 47, the output of which rotates rollers 45 to provide a predetermined and constant pulling force on clad rod 44 so that between straightener 26 and pulling device 43 the axis of the core remains precisely coincident with the theoretical passline 10 within very narrow limits not heretofore deemed obtainable. The pulling device 43 also acts as an aligned horizontal roller guide and the distances between sizing die 31 and guides 39 and 43 are such that the engagement between the exterior of relatively hot clad core rod 44 and the rollers of those guides will not make any significant change in the concentricity of the cladding layer relative to the core, or detrimentally mark the cladding layer, nor will there be deformation of the core itself in the clad rod under a proper practice of this invention.

A post cladding section of the apparatus also is shown in FIGURE 1. It may comprise quench members 48 and 49 to obtain particular metallurgical qualities and/or cooling in the clad rod. While shown in the illustrated apparatus as immediately following pulling device 43, a quench or cooling element or elements may be positioned elsewhere following such pulling device and may be associated with other treating equipment such as a continuous annealing furnace or other items of metal treating equipment, or still other items may be employed without departure from this invention because such items would operate on the now-made clad rod produced by this invention. A further feature in the post cladding section which may be employed is a slack span of clad rod 44 which may be caused to occur any where after pulling device 43. Such slack span is a convex downwardly bow preferably of a catenary character for minimum tension in clad rod 44 between device 43 and a support such as a sheave 52 associated with a coiler 53 at the end of the line in the form of a wiremill "hat" coiler. Such minimum tension may be controlled within desired limits by employing a slack switch 50 having an arm 51 which rests on said downward bow. If desired, a support roller for the entry end of the catenary may be provided following quench item 49, for example, with the result that passline 10 would be rigidly and precisely straight between straightener 26 and pulling device 43, relatively straight between straightener 17 and straightener 26 and also relatively straight between pull device 43 and such entry support point for the catenary bow following quench 49. Indeed, the only portion of passline 10 which must be precisely straight, whether level or otherwise, is in the portion of the line between straightener 26 and pulling device 43, or more specifically, across cladding furnace 30 and its associated members 29 and 31.

In the intermediate section of the feasibility demonstration apparatus illustrated in the drawings, there must be precision alignment of the items of equipment therein so that the passline is absolutely straight, and preferably precisely level, through that portion, although in other portions of the over all apparatus line, the passline may be changed in direction. Moreover, the alignment of the passline in the intermediate section has to be precisely coincident with the axis of the core rod to produce the relatively truly concentric cladding desired in present day commercially valuable clad rod and its derivative electrical and mechanical products. In addition, the alignment in the intermediate section taking into account the change in position of the equipment items in the vicinity of the cladding furnace because of expansion at the selected operating temperatures and the change in diameter both of core rod, cladding metal and clad rod due to temperature changes along the line also is a feature embodied in the apparatus and a practice of this invention. For that reason among others, the center of the bite between rollers 45 may be used as a datum in terms of the height above grade and the lateral position in space, for the axis of the precisely straight portion of passline 10. Such a datum does not disturb the motor torque control connected to rollers 45 which are driven by their respective shafts 54 keyed to spur gears 55, the fixed one of which in turn is driven by the shaft 56 of gear box 47.

Turning to FIGURE 13, the fixed shaft 54 is to the right and the housing 55a of pulling device 43 is bolted to its stand 42. The left-hand shaft 54 keyed to its roller 45 is transversely movable under the bias of a compressed spring 58 which in turn has an adjustable pressure determined by the position of adjustment screw 59. Grooves 60 of rollers 45 are polished and when clad rod 44 is therebetween, the rollers are separated by a gap 61 to insure relatively non-slip pulling by those rollers as they rotate respectively in the directions of arrows 62 and 63, the grooves being slightly relieved as they approach the gap on each side. To maintain grooves 60 free of any dirt which might otherwise lodge therein, substantially non-wearing scrapers 64 of circular cross section lie tangentially in such grooves, the engagement being maintained by tension springs 65 anchored at one end to the housing of device 43 and gripping the scrapers 64 at the other end, the hub of the scrapers being pivoted at 66 to such housing. The structure of vertical roller guide 39 (and guide 27) is substantially the same as that of device 43 except that neither roller 67 of guide 39 is driven; the lower roller 67 being fixed and the upper roller being spring biased toward it as in the case of device 43. In order to align guide 39 with the groove of lower roller 67 precisely conforming to the datum established by right-hand roller 45 in FIGURES 12 and 13, the housing of guide 39 is shimmed to the proper height on stand 42 and the lateral adjustment screws 40 on each side of the housing 39 are adjusted for the transverse movement required for such alignment whereupon the housing of guide 39 is bolted fast to the stand 42. The fixed equipment in the feasibility demonstration apparatus being described in turn is fastened to the floor of the plant in which the apparatus is erected. If desired, the lower roller 67 may also be driven, or devices 39 and 43 may be used as undriven guides with the torque-controlled tension device following them in the apparatus.

The most significant apparatus item is cladding furnace 30 and its immediately associated equipment. Furnace 30 as shown comprises lower, intermediate and upper walls 68 of castable refractory, such as Alundum, in which walls induction heating coils 69 are respectively imbedded. In each of the superposed wall sections, the coil 69 of hollow copper tubing has a separate inlet end 70 and an outlet end 71 for connection by appropriate couplings to a coolant such as water flowing in the direction of the small arrows shown. To such inlet and outlet ends are attached electrodes 72 for connection to the motor-generator set which supplies alternating current power for the induction heating by its coil 69. By having each coil separately connected in each wall section, flexibility of heating may be obtained. A refractory base 73 is provided supported by table 33, the whole being bound by a steel frame 74 inclusive of semicircular straps 75 connected to the column members of frame 74 on opposite sides of the furnace. Base 73 is provided with two drain openings 76 normally closed by graphite plugs 77.

The interior of furnace 30 is provided with a graphite liner 78 in three superposed wall sections, the lowest section having an integral bottom 79 and drain openings 80 in registry with the drain openings 76. Graphite sleeves 81 line the openings 80 and are a part of bottom 79. The openings through such sleeves are normally closed by the upper portions 82 of plugs 77, the upper tip of each of which preferably is a conical frustum. Liner 78–79 rests on solid graphite rings 83 around the openings 80 between bottom 79 and base 73. The space between such liners 78 and the inside of the wall 68 and base 73 is filled with tamped insulating carbon particles. The grain of the graphite liner, of the graphite sizing die 31 and of the graphite entry guide 93 and their respective graphite bushings 84 and 85 is in the same direction to inhibit expansion stresses that otherwise might be incurred when the cladding furnace is at operating temperature. At the top of furnace 30, a refractory ring 86 is provided around the top of wall 68 and the liner is surmounted by an annular refractory closure 87. A graphite pouring cup 88 having a pour hole 89 in the bottom thereof sits on a shoulder in the uppermost section of graphite liner 78. The cup 88 is closed by a cover 90 having a hole 91 therein through which protective non-oxidizing gas such as nitrogen may be discharged during an operation. The wall sections 78 of the liner are joined together so as to prevent leakage therethrough of the molten cladding metal present in furnace interior 92. The selection of graphite for liner 78–79, for entry guide 93 and its bushing 85 and for sizing die 31 and its bushing 84, as well as for pouring cup 88, is due to its temperature resistance and because a cladding metal such as copper does not "wet" the graphite, nor adhere thereto as a general rule, nor is the cladding metal contaminated in any way by graphite. For other cladding metals which may be used in the practice of this invention, some other suitable material may be employed and other suitable materal may also be employed when molten copper is used as a cladding.

Diametrically opposed threaded conical openings in the lowermost section of liner 78 respectively receive the bushings 84 and 85. The inner portions of such bushings taper inwardly and fit snugly against the conforming portions of the corresponding openings in the lowest liner section. The outer portions of those bushings are internally and externally threaded, the external threads engaging corresponding threads 94 in the graphite liner openings. Bushing 85 has a central bore the inner end of which is conical tapered and the outer end of which is cylindrically threaded to precisely fit entry guide 93. Entry guide 93 is provided with a central passline bore 95 therethrough. Bore 95 is drilled somewhat larger at 96 to receive a sleeve insert 97, which also may be made of Alundum, polished on its inside and outside surfaces, or such sleeve may be made of a carbide similarly highly polished. Preferably, the inside diameter of bore 95 and/or insert 97 so closely surrounds the straight length of core rod 12 passing therethrough as to prevent any molten cladding metal from flowing outwardly through entry guide 93 during an operation. Insert 97 is held in place by an annular nut 98 threadably engaging a correspondingly threaded recess in the inner face of guide 93. The outer end of guide 93 is provided with a counterbore 99 for a graphite gas flow annular fitting 100. The inner end of fitting 100 is provided with three radially and axially extending feet 101 to space such inner end from the inner end 102 of counterbore 99. A longitudinally extending drilled opening 103 receives the end of a quartz tube 104, one-half of said drill 103 being in fitting 100 and one-half in guide 93. A quartz tube 105 larger than core rod 12 has its inner end seated in a counterbore around the inside of the central opening through fitting 100. Quartz tube 105 is a portion of the heating element 29 and is surrounded by a hollow induction heating tubular coil 106, the ends 107 and 108 of which are respectively the inlet and outlet ends for the water or other coolant passed therethrough. In addition, electrodes from an A.C. motor-generator set may be fastened respectively to such inlet and outlet ends 107 and 108 for the electrical power connections to furnish the power for the induction heating performed by element 29. As shown, heater 29 is potted in a castable material 109 which may be Alundum, the inner end of which is provided with an annular asbestos or quartz gasket 110 to cover the graphite outer faces of bushing 85 and guide 93 to protect them against oxidation at operating temperatures.

The outer end of quartz tube 105 is fitted to an aspirator 111 surrounding the passline and core rod 12 moving concentrically therealong. Such aspirator has an inner piece 112 in sealed relation to the outer end of tube 105 and an outer piece 113 threadably engaging piece 112, the two together defining an annular air pressure chamber 114 which is supplied with compressed air by a pipe 115. The outlet of such chamber is in the form of an annular conical frustum opening 116 adapted to increase the velocity of the compressed air passing therethrough in a direction countercurrent to the movement of core rod 12. A cap nut 117 has a central opening 118 which also is radially spaced from core rod 12 to discharge such aspirating air and aspirated gas in an upstream direction. Such aspirating air causes a protective-reducing gas such as forming gas (90% N, 10% H) at a provided pressure close to one atmosphere to be drawn into the reentrant passage between surface 102 and the inner end of fitting from whence it flows into tube 105 under a positive differential pressure due to the aspirating air supplied to aspirator 111, such protective gas being discharged through the annulus 118. In addition, any gas which may have gotten into the central bore of guide 93 is also pulled out through the inside of tube 105 and such countercurrent movement of protective gas surrounding core rod 12 not only protects it against scaling in case the core rod is oxidizable, while it is being heated, but it also tends to remove from the surface of such core rod occluded or adherent gases and dust particles which otherwise might remain on the surface of core rod 12. It has been discovered that such countercurrent protective gas sweeps over the whole of the outside of the core rod and is highly advantageous in inhibiting the formation of pinholes through or gasholes in the subsequently formed cladding layer, and, in promoting the diffusion bonding obtained when the cladding layer is applied to the heated clean core rod in furnace 30.

Heater 29 may be supported on the underside by a bracket 119 affixed to a base plate 120 of frame 74 beneath base 73. A flexible heat-resistant hose 121 is used to provide forming gas for the inlet quartz tube 104 and the inner end of heater 29 in assembled position is then caulked in place as shown in FIGURE 3 by a suitable refractory "mud" 122 holding heater 29 against the outer faces of bushing 85 and guide 93 and the protective gasket 110.

Elongated sizing die 31, of graphite, is made by precise machining, reaming and polishing. It has an extension nose 123 which extends into and is always submerged in a pool of molten cladding metal 124 in the furnace space 92. Nose 123 has an annular circular ogival tip 125 and ends in a central bore 126 the entry end, preferably, of which is cylindrical and the precise diameter of the desired size of finished clad rod allowing for its temperature at that place. Nose 123 broadens in the exterior middle portion thereof into a conical portion 127 and a threaded portion 128 which fit into and precisely against the inside of bushing 84 which in turn threadably engages the opening on that side of liner 78–79. Preferably bore 126 continues from its entry end in the direction of movement of the clad rod and preferably flares very slightly, portion 126a, immediately following the entry through the remainder of the die 31 from which the hot and now-clad rod 44 is discharged. The flare of bore portion 126a in the direction of movement of clad rod 44 along passline 10 is very small and may be no more than one mil on the diameter basis per inch of length. Further, the outside of tail 129 of sizing die 31 may be tapered in the passline movement direction and, it is believed, promotes the cooling (and contraction) of clad rod 44 which will start to take place at some point in the body of die 31, believed to be a short distance ahead of the location of bushing 84. It may also be noted that in the illustrated apparatus, bushings 84 and 85 preferably have cylindrical flanges 130 projecting into pool 124 to inhibit any "chimney" effect in the pool that might otherwise occur in the course of which molten cladding metal would tend to move downwardly along the inside wall surfaces of liner 78. Normally, opening 131 through wall 68 may be left open save for a facing coating 132 of removable refractory "mud" to prevent oxidation of the outer face of bushing 84 and the body of die 31.

Alignment of the passline 10 through heater 29, guide 93 and die 31 is provided for in the mounting of table 33. Such mounting includes corner posts 34 rigidly affixed to the plant floor and brackets 133 on each thereof supporting a strain gauge load cell 134 having a sensor post 135. Each sensor post 135 supports an inverted L-shaped bracket 136 with parallelogram linkage 137 pivotally connecting it to the upper part of its post 34. Bracket 136 is connected to a worm and worm-wheel device 138 which rests on post 135 and may be turned in an appropriate direction by a handwheel 139. The device 138 is capable of turning a screw shaft 140 which is affixed between the top of bracket 136 and the worm and wheel device 138 so that it can be rotated but not translated save for the minute translation that occurs as the links 137 move due to any vertical movement of sensor 135, which normally is not more than .001 of an inch if it is that much. Screw thread 140 engages an internally threaded non-rotatable nut 141 pivotally affixed to the corner of table 33, and, as shown in FIGURE 9, the respective handwheels at the entry and exit ends of table 33 operate the two devices 138 at each end. Hence, the respective manipulations of the handwheels 139 will raise and lower the aligned center of tube 105, entry die 93 and sizing die 31 all together by the raising and lowering of table 33, to which base plate 120 is clamped, after all adjustments are made, by clamps 143. Base plate 120 is provided with upstanding integral fastener plates 144 affixed to frame 74 on each side of furnace 30. In addition, the pivotal mounting by pivots 142 of nuts 141 between downwardly extending flanges of table 33 also means that furnace 30 and the aligned openings therethrough can be tilted in a longitudinal direction either to make them level when, as is preferable, the passline is level, or to register with the slope of the straight passline should it be not quite level between straightener 26 and pulling device 43.

Transverse translation of base 120 and thence of furnace 30 with its immediately associated equipment is achieved by worm and wormwheel devices 145 which are operated by handwheels 146 and are provided with a transversely extending screw shaft 147, the far end of each of which rotates in a pendent bearing 148 fixed to the underside of table 33. The two shafts 147 are on opposite sides of the transverse median plane through furnace 30 and each is engaged by a nut 149 mounted in horizontal and vertical gimbals affixed to a downwardly extending bracket 150 fixed to the underside of base 120. Hence, identical movement of both handwheels 146 will move base 120 in transverse translation for that adjustment if needed in the course of alignment. On the other hand, if the center of the passage through heater 29 and die 31 is horizontally twisted slightly away from the straight passline between straightener 26 and pulling device 43, a slight horizontal rotation of base 120 can be accomplished by moving one of the handwheels 146 relative to the other because of the universal mounting of the nuts 149. After alignment of furnace 30 and its immediately associated equipment into coincidence with the passline 10 based on the datum center fixed by the right-hand roller 45, the bolts which hold the clamps 143 to table 33 can be tightened to lock base plate 120 in aligned position. Then, table 33 and base 120 are lowered an amount equal to the distance that the alignment line through heater 29, die 93 and die 31 will rise in the course of their being brought to operating temperature which in the apparatus illustrated is a vertical distance in the order of .038 to .040 of an inch. There usually is no disturbance of the transverse alignment of the center line relative to the defined passline 10 but if there is it can readily be corrected as pointed out above before the start of an operation or series of operations. Moreover, there is no disturbance of the alignment adjustment for cladding furnace 30 and its immediately associated items because of the presence and action of the load cells 134 and sensor posts 135 inasmuch as they will indicate by net weight difference the amount of molten cladding metal in interior 92 without changing such alignment adjustment inasmuch as the amount of movement required in the case of items 134 and 135 is so extremely minute.

The drain plugs 77–82 which are operated at time of shutdown, or in the event of some stoppage of the movement along passline 10, to rid interior 92 of molten cladding metal therein, which then drains into receptacle 37 and into which the drain plug or plugs also fall. Two such drain plugs are provided in the embodiment shown as a protective measure for the furnace 30 and die 31 in the event one should stick. Each of them is provided at its lower end with a hole 151 through which a pin 152 is passed with the outer ends projecting into a horizontal slot 153 on the inner side of a rocking plate 154, a pair of which span each drain plug base 77. Each such pair of plates 154 is fastened to a handle 155 having a grip 156 which can readily be reached by someone standing at the side of the table. Each such pair of plates 154 also is slidable and pivotable about a pivot shaft 157 mounted in fixed brackets 158, the shaft 157 having ends which project into the same slots 153 on the inner side of each of the plates 154. Handle 155 is provided with an adjustable set screw 159 which rests against a depending stop 160 fixed to table 33. When the parts are in the position shown in FIGURES 9 and 11, the drain plugs are closed. To open either one, grip 156 is pulled to the right (FIGURE 11) until screw 159 is just to the right of stop 160; then grip 156 is lifted to rock the respective pair of plates downwardly about pivot 157 causing the slots 153 to pull downwardly on pin 152 and drop the drain plug 77–82 away from the bottom of the furnace. Inasmuch as grip 156 can be pulled farther to the right after the loosening of the drain plug to move plates 154 entirely clear thereof and of its pin 152, the plug will fall into receptacle 37.

As the newly clad rod 44 exists from pulling device 43, it may be partially cooled, or quenched, by submersion in quenching device 48. Device 48 has a stand 161 on which an overflow trough 162 is fixed, the clad core entering and leaving the respective ends of troughs 162 by vertical slots 163 open at their respective upper ends. An inner immersion trough 164 is supported from the top of trough 162 by cross straps 165 welded or otherwise fixed thereto, the immersion trough having openings 166 through the respective ends thereof for the clad rod 44 which is initially started by threading core rod therethrough at the start of an operation. Supply pipes 167 supplied by a water header 168 discharge water into emmersion trough 164 at a selected rate to achieve a desired amount of cooling. If further quenching is desired at such longitudinal position along the apparatus line, a quench spray cabinet device 49 may be employed having slots 169 at each end, with split flap wipers of rubber fabric, if desired, to substantially close such slots except for the entering and leaving clad rod. In quench device 49, water supplied by headers 170 supplies spray pipes 171 having longitudinally spaced nozzles 172 therealong to spray the passing clad rod at the desired rate. Overflow in the quenching devices 48 and 49 is taken out to a sewer, or to a recirculation sump for a cooling tower, through respective drain pipes which are not shown. The height of the openings 163, 166 and 169 and the distance between the upper and lower spray pipes 171 is sufficient for any amount of vertical movement which may be allowed to take place along such quenching portion of the passline 10 because of any bow allowed therein after pulling device 43.

Inasmuch as one of the features of the invention is that it can use a wide range of metals for cladding and/or for core, it is evident that the treatment of the clad rod following its exit from die 31 may be varied extensively without departure from the cladding invention itself. In the case of copper-clad steel-core rod made by this invention, core steels used may vary as widely as the range between C–1006 and C–1090 steels, a matter not before possible in mold making of copper-clad steel-core rod product. Such a range of steels therefore means that the user of the invention may use a correspondingly wide variety of treatments for the clad rod. Thus, a core comprising C–1045 steel in copper-clad rod may be so treated as to produce a microstructure similar to air patenting by water quenching the copper-clad rod 44 leaving a pulling device such as device 43, to about 1500° F. and then allowing it to air cool to room temperature. Control of the quenching as in quenching devices 48 and/or 49 can be regulated by the use of "Tempilstiks" or other means. With C–1032 and lower carbon steels, the quench might be used simply to cool the rod below the critical temperature of the steel core leaving the remainder of the cooling to take place in air as illustrated in FIGURE 1. When desired, in a copperclad steel-core rod made by this invention, a tempered martensitic structure may be obtained by rapidly quenching a clad rod 44 to below 1000° F. and immediately stress relieving it by passing it through an induction coil following which another quench may be used to cool the annealed clad rod for ease in coiling at the end of the line.

In the illustrated demonstration apparatus, further, the downbow slack in the passline between pulling device 43 and end coiler 53 is preferred so as to exert minimum tension upon the slack span following the exit side of device 43, or at least to free clad rod 44 and core rod 12 in the intermediate section from the effect of the jerks, pulls and slackenings occasioned by the mass and operation of coiler 53. This is accomplished by means of a variable resistor in the speed control circuit of the coiler motor 173 so that the motor's speed increases as arm 51 descends from its normal slack span datum position and decreases when the arm rises therefrom, element 50 thereby acting as a modulating control. Or, maintenance of minimal tension on clad rod 44 after pulling device 43 may be obtained by having a two-way electrical switch in slack switch 50 with the result that when the sag bow of clad rod 44 reaches the predetermined lower limit, it will operate a motor 173 to turn coiler 53 and wind up additional turns of clad rod 44 on the reel 174 thereof, such coil reeling continuing until arm 51 rises to the selected upper limit of the sag bow making a second contact in the two-way switch and shutting off motor 173. Hence, whether or not coiler 53 is in operation, the movement of rod through the apparatus and pulling device 43 is continuous and, in addition, the transmission of acceleration and deceleration forces occasioned by starting and stopping coiler 53, is inhibited relative to other parts of the line, further promoting steady state conditions in operation particularly in the intermediate section of the apparatus.

At least in the initial start-up of an apparatus of this invention, the precise alignment of the intermediate section is essential at least between roller guide 27 and roller guide 39 and preferably between straightener 26 and pulling device 43. In the illustrative example of a copper-clad steel-core rod producable by this invention, such alignment may be effected by the use of a taut piano wire extending between pinch rolls 175 of straightener 26 and pulling device 43, the ends of the piano wires being looped, for example, around steel bars resting perpendicular to the passline in the grooves of the respective rolls, the end of the piano wire on the surface side of a turnbuckle being joined thereto after the necessary threading thereof through the equipment items and sizing plugs. The piano wire is provided with a turnbuckle positioned between rolls 179 and 27 so that it can be made taut. In the course of the threading of the aligning piano wire, aluminum plugs of precisely selected outside diameter are axially drilled through the center to close tolerance with the piano wire and threaded thereon for gauging purposes in the course of such alignment. Assuming the core rod to have an outside diameter of .390 of an inch when cold, the sizing gauge for roller guide 27 will have the same outside diameter and will be positioned in the bite of the V-shaped grooves of the upper and lower rollers thereof. The next gauging plugs are .540 of an inch O.D. for the entry guide 93 and a further one with an outside diameter of .470 of an inch which will fill the exit end of the sizing die 31, on the assumption that a cladding of .030 of an inch thickness (cold) is to be bonded to the core rod during its passage through furnace 30 making the total diameter of the clad rod 44 at the exit equal to .450 of an inch plus the additional dimension due to transverse expansion of the bimetallic at the exit temperature and allowing for the flare clearance in the bore of the die 31. The sizing plugs for the rollers 45, and the rollers of guide 39, correspondingly will have an outside diameter of .456 of an inch. Hence, when the turnbuckle is turned to make the piano wire taut, physical viewing will indicate where adjustment may be necessary for the precise alignment being provided for in the intermediate section. Other true alignment means may be provided for such as the use of a surveyors' transit or level placed, for example, ahead of or behind straightener 26 to sight down toward pulling device 43; in such surveying alignment, the aluminum gauge plugs may be used with a sighting light behind the one in pulling device 43 so that a superstraight alignment and passline 10 may be obtained alternatively without the use of such a piano wire. And, other alignment means may be used such as an extremely rigid and straight gauge rod passed through the longitudinally registering openings in the equipment items of the intermediate section. A check upon the alignment is also obtainable at the start of an operation when the core rod begins to move through them along the passline when the concentricity can be surprisingly closely gauged thereby. The result is, that coincidence of the theoretical passline 10 and of the core rod and clad rod moving in the intermediate section may, in an optimum operation, vary even less than .005 of an inch. Such close tolerances for concentricity between core and cladding in a bimetallic clad rod has been unobtainable as a practical matter in prior commercial practices.

In starting up an aligned demonstration apparatus, the induction heater coils 69 are turned on to bring the liner 78–79, and bushings 84–85, the inner portion of the sizing guide and of the entry guide 93 approximately to the temperature at which molten cladding metal will be poured into pouring cup 88, when cover 90 is removed, at the start of an operation. During the preheating of the furnace, which occurs after alignment and after the alignment means used have been removed and the furnace lowered the amount it will rise during expansion, close tolerance graphite rods are laid carefully in the bores of entry guide 93 and sizing die 31 to keep the furnace interior closed during such preheating. Such pouring is performed after furnace 30 is brought up to temperature to cause the molten cladding metal to flow into space 92 through opening 89. The bath 124 of cladding metal is always maintained so as to keep submerged the inner ends of the sizing die 31 and of the entry guide 93.

In the case of a copper-clad steel core rod with diffusing bonding between the metals over the entire interface between them, the copper preferably is a commercially pure form such as electrolytic copper conforming to ASTM Specification B5–43, particularly when making electrical conductors. Such copper may be melted in an electrical induction furnace under a protective charcoal blanket to keep the cladding metal from picking up oxygen. The specification for the copper when it is to be used in making electrical conductors as distinguished from mechanical goods will have a maximum iron specifictaion of .005% by weight and phosphor-copper may be added to the melting furnace to deoxidize up to a maximum phosphorous content of about .010 to .015% by weight. Lithium may be added also in the transfer ladle used to convey molten copper cladding metal from the melting furnace to the pouring cup 88. In other words, to produce molten cladding metal such as copper which is as gas-free as possible and to inhibit pick-up of hydrogen, those degasifying agents may be used which are in regular use in the copper casting industry. There has been no need shown to go to the added expense of vacuum degasing of a cladding metal but it may be done, if desired. In order to continue the protection of the molten cladding metal, such as copper in the bath 124 against oxidation, a bed of ignited charcoal 177 may be maintained between pouring cup 88 and ring 86. In addition, a lance with a non-oxidizing gas may be inserted through opening 91 and opening 89 when no pouring is going on to fill the interior of space 92 with protective gas before such pouring. Thereafter the protective gas may simply be supplied to the interior of cup 88 since it will thereby avoid any cooling of the heated interior of space 92. During the presence of the molten bath in the lower portion of furnace 30, the lowermost section at least of the induction heater coils 69 may be turned on if desired to maintain the selected temperature in the bath. Thermocouple wells of graphite entering the interior of the bath above and below die 31 are not shown but preferably are used to provide a continuous indication of the molten cladding metal temperature at those locations. During such preheating and the use of furnace 30, the drain plugs 82 are closed.

The other metal component, the core rod 12, is usually cold when the coils are put on the flipper pay-out arms 14. After being straightened and cleaned, the core rod 12 is pulled by the rollers 175 and 176, receives its second straightening by the multiplane banks of straightener rollers 178 and 179, the straightener 26 also exerting some push on the relatively stiff core rod 12 which has a beam strength of its own. Such core rod 12 proceeds through heater 29 where its entire surface is swept in a countercurrent direction with a relatively high velocity protective gas such as forming gas to remove any adherent dust and gas particles as well as to prevent oxidation in the course of such heating of the core rod by the heating coils 106. Within furnace 30 the core rod 12 is converted into a clad rod 44 with a predetermined external diameter (when cold) and a diffusion bond between the metals over their entire interface, the clad rod 44 resulting moving on through the pulling device 43 and the rest of the line as described above.

In starting-up, the core rod 12 may be threaded through the preparatory section and brought into the rollers of straightener 26 by the pinch rolls of stand 25. As soon as the pinch rolls 175–176 of straightener 26 have taken over, rolls 25 are separated to inactive position. The straightener rolls then feed the core rod front end to a position ahead of but adjacent roller guide 27 where such front end is pointed with the tip of the point a small cylindrical neck. Following preheating of the furnace causing its expansion so that the passline therethrough again is on a level with the passline through the intermediate section, straightener 26 is carefully started to push the pointed core rod through the guide rollers of entry guide 27, the aspirator 111 and the quartz tube 105. In the meantime, a highly polished starting rod of slightly larger diameter than the core rod, has been carefully inserted through the rollers of pulling device 43, of roller guide 39, the sizing die 31 and into the exit end of entry guide 93 in a direction counter to the forthcoming direction of movement of the core rod 12. The front end of the starting rod is provided with a female recess which conforms in reverse with the pointed front end of the core rod which fits into said recess in a coaxial manner. Then, the straightener 26 is turned on until the front end of the core rod nests in the recess of the starting rod, pushing it and the starting rod when straightener 26 is restarted, pushing it and the starting rod through the remainder of the intermediate section in the equipment line. In that way, the core rod is threaded through furnace 30 in sizing die 31 without scoring the bore 126 of the sizing die 31. When the pointed front end of core rod 12 is engaged by the rollers of the pulling device 43, the starting rod is backed off and removed. Then the front end of the core rod can be joined to an adapter to connect it to a rope threaded along the remainder of the equipment so that when coiler 53 is turned it will pull and thread the core rod through the rest of the line until such front end can be attached to the coiler reel. Then the rod moving and cladding equipment in the line can be turned on.

In starting-up, further, the heated cleaned core rod 12 moves along passline 10 through the intermediate section preferably near the selected line speed when molten cladding metal is poured into the preheated empty furnace interior 92, such pouring continuing until the pool 124 surface reaches the desired level below cup 88. Usually, the top surface of the molten cladding metal bath initially at least will be somewhere in the middle section of the liner wall 78. The quantity of molten metal put into furnace 30 is indicated by the load cells 134 and sensors 135, which also indicate when the level of the molten cladding bath has fallen to a level, still above die 31, at which the user desires to replenish the supply of molten cladding metal. It may be noted here that variation in height of the molten metal cladding bath in the furnace interior 92 seems to have no detrimental effect on the cladding operation. In due time, a self-replenishing constant bath level furnace is likely to be designed and used for a practice of this invention. As the core rod moves through the bores of the entry guide 93 toward die 31 and across the predetermined open space therebetween in interior 92, molten metal adheres thereto in straggly amounts at first until a steady state condition is obtained after which clad rod 44 is produced continuously with a complete coherent solid cladding layer entirely around the core and diffusion bonded thereto. After such starting, the clad rod continues to be made as long as desired and coiled on the reel 174 of coiler 53, the lead portion of the coil then being cropped off at the point where sound clad rod begins.

And, if there is to be a shutdown, the rod line will continue its movement through the apparatus while the molten copper remaining in furnace 30 is removed by opening one or more of the drains 77–82, the heater 29 is shut off and the sound rod produced up to the time of such draining has the following rod portion cropped off. Then the other equipment may be shut down also.

While it is believed that the operation of process and the illustrated apparatus of this invention are clear from the foregoing, a representative operation is described at this point with respect to the copper cladding of a preformed steel-core rod of predetermined diameter to produce by means of this invention a clad rod of predetermined diameter and high grade commercial value. For such purpose, let it be assumed that the coils of core rod 12 are of hot rolled steel having a composition of C–1032 (AISI) which has been drawn and has an outside diameter of .390 of an inch. Such core rod is alternately fed in a continuous length from the respective coils on the pay-out stands 11, the ends of such coils being welded in endless succession and the flash removed. The pay-out is continued by the pinch rolls 18 and the straightener rolls 19 straightening the core rod. The core rod then passes twice around the sheaves 21 and 23 so that the upper reach 24 passing through blaster 20 comprises three laterally spaced lengths of moving core rod. The blaster 20 uses shilled iron grit to clean the rod of all scale and other adherent material. The cabinet in which blaster 20 is enclosed is subject to a vacuum system for the removal of dust which is sifted out of the recirculating chilled iron grit before the grit re-enters the throwing wheels. Normally, it is not necessary to degrease or deoil the core rod coils beforehand but such may be done if needed, preferably before they are placed on the alternating flipper arms 14. While the grit blaster 20 is shown, the entire surface of the core rod may be cleaned instead by chemical or other means. The cleaned core rod 12 then moves along the passline 10 between the opened pinch rolls 25 which do not function in the course of the cladding part of an operation. Instead, the pinch rolls 175 and 176 pull the cleaned core rod in the direction of arrow 15 out of the grit blaster and toward the rollers 178–179 of the second straightener 26, which insure against the slight bowing and arching which may otherwise remain present in the clean core rod 12. Additional precision in maintaining axial coincidence between the theoretically straight passline 10 and the axis of the core rod in the intermediate section of the apparatus is promoted by the use of the aligned roller guide 27. The cleaned core rod immediately upon leaving roller guide 27 enters the central opening 118 in cap 117 in the aspirator 111 and then passes into the tube 105 of heater 29. Between the cleaning equipment at 20 and the entry of the clean clad rod into heater 29, scrupulous care is taken to prevent any contamination of the clean surface of the core rod although it has been found unnecessary to enclose it during that portion of its movement along the passline.

Following entry into opening 118, cleaned core rod 12 is subjected to countercurrent scrubbing over its entire surface by a protective gas such as forming gas (90% N, 10% H) moving past the rod with a relatively high velocity. The protective gas prevents the formation of oxides on the core rod surface during the heating thereof by induction heating coils 106, removes dust and adherent gas from such core rod 12 and places the bore of entry die 93 under a slight vacuum tending to suck any dust or gas particles therein into the stream of forming gas which flows under a positive differential pressure toward and through cap 117 to the outside thereof. The heating of the core rod in the example being given is through heating to a temperature in the neighborhood of 1600° F. for that size of core rod on which a cladding layer thickness of .030 of an inch of copper-cladding is to be provided in the cladding furnace 30. Such core rod temperature correlated with the temperature of the molten copper in furnace interior 92 preferably held between 2000° F. and 2100° F., the speed of the line, preferably upwards of 35 feet per minute, and the exposure distance defined by the distance of the inner end of the sizing die 31 from the inner end of entry guide 93 where the heated, cleaned core rod is directly and briefly engaged by molten copper in the furnace bath 124, insure direct diffusion bonding between the core rod and a cladding layer which freezes thereon due to the cooling capacity in the core rod entering the molten copper bath, relative to molten copper. It is believed such cladding layer freezes progressively radially outwardly against the core rod during its aforesaid exposure virtually to the desired cladding layer thickness by the time such freezing cladding layer and accompanying core rod enter the inner end of sizing die 31 which is at the temperature of the molten copper bath surrounding it. Further, the correlation appears to be a range band correlation, rather than a point correlation, which will accommodate a spread of conditions without upsetting the quality of the clad rod product. It is believed also that the outer surface of that freezing cladding layer entering the inner end of sizing die 31 is wiped by polished entry into bore 126 without adherence therebetween when the outside diameter of the cladding layer tends to exceed the diameter of that bore; and conversely, when the cladding layer tends to be deficient in the desired thickness as it enters the inner end of bore 126, a minute amount of molten copper flows into that bore past the inner ogival end 125 to bring the freezing cladding layer, believed caused virtually entirely by the cooling capacity of the core rod, to the precise dimension of the polished entry size of bore 126 (.460"). Molten copper does not "wet" graphite and as a result, such wiping at the die entry appears to be a sizing with the instant of final solidification of a precise and full thickness of cladding layer occurring just inside bore 126 which also acts as a polishing sizer on the virtually plastic outermost surface of the just frozen cladding layer. As a consequence, the surface finish of the hot clad rod 44 issuing from the outer end of die 31 is smooth and there appears, moreover, to be a self-centering tendency of the core rod in the bath in connection with formation of the cladding layer and the entry into precision aligned sizing die 31. It is believed that as clad rod 44 leaves the entry of die 31 and reaches the slightly flared bore portion 126a of the sizing die, the plasticity of the outermost molecular layer of the cladding had disappeared and a solid, although hot, cladding layer is then bonded on the clad rod product 44. The extension 129 of the sizing die into the space outside furnace 30 furnishes a length in which cooling of the hot clad rod 44 can take place to some extent substantially out of contact with air. The concentricity and precision results of such operation appears also to be helped by the beam strength of the core rod 12 in the intermediate section assisted by its various roller guide supports and by the fact that the core rod also is supported to some extent by the molten bath in pool 124.

In the feasibility demonstration apparatus described above, the diameter of space 92 is 8 inches and the furnace 30 will hold a charge of 500 lbs. of copper, which is replenished when the load cells 134 indicate that the weight of molten copper in the furnace has dropped to about 200 lbs. The temperature of the molten copper is maintained below 2100° F., it having been discovered that thereby the cladding layer remains free of troubles such as pinholes and gasholes caused by gas in the cladding layer. Studies to the present time indicate that in the instant example, the heating of the steel core rod may be as low as a minimum of about 1400° F. when the bath temperature is somewhat above 2100° F., for a given speed, or that the exposure distance of two inches in the representative example may be increased toward three inches either for higher speeds or for lesser temperature differentials between the steel-core rod and the molten copper temperature. Present indications also are that the speed can approach as much as 150 feet per minute utilizing the feasibility demonstration apparatus in the copper cladding of steel core rod. Further, such sizing die 31 actually used has a length of about 11", approximately six inches of which extended into space 92 and the molten pool 124, the bearing portion of bore 126 preferably being very brief in length adjoining the annular ogival tip 125, the remainder of the polished bore 126a being about 10" long and having a flare in the direction of movement of the rod line 10 in the order of an additional .001 of an inch on the diameter per inch of length of such remainder, so that the clad rod is optimally but briefly in contact entirely with the sizing die around its entire circumference, although dies with longer straight bore portions may also be used.

The guide rollers 39 and pulling device 43 are positioned approximately one yard away from sizing die 31 in the representative example inasmuch as it has been found that at that distance there is no detrimental marking from the commercial viewpoint of the cladding layer of the hot clad rod 44 by the rollers. In the quench devices 48—49 in the representative example, the hot clad rod is cooled by them to approximately 1600° F., its remaining cooling toward room temperature occurring as it moves along toward coiler 53 and in the coils made by that coiler. In the movement of the core rod and clad rod along the respective first and second portions of the passline respectively in the intermediate section, different transverse expansions and contractions take place as temperatures change as pointed out earlier herein, the precision openings in the cladding furnace and immediately associated elements being precisely sized accordingly. Further, inasmuch as the steel core rod strength is reduced at elevated temperatures, pulling device 43 is torque controlled. Hence, irrespective of what longitudinal extension takes place within cladding furnace 30, the pull upon the clad rod 44 exiting therefrom is constant. It is believed that the push upon core rod 12 by straightener 26 is dissipated intermediate that straightener and the furnace 30, but in any event, the pull by pulling device 43, which may be in the order of up to 300 lbs. in the case of steel core rod is enough to keep the clad rod moving in its super-straight course preferably approaching maximum tension through the cladding furnace but, at the same time, is always insufficient to cause any necking down of the core rod metal. Consequently, the uniform diameter of the clad rod product is preserved and the predetermined diametral relation of core rod diameter to clad rod diameter in the clad rod product, is also preserved. Still further, the aforesaid correlation taken with the time of movement of the clad rod between cladding furnace 30 and quench device 48 provides a further control of the extent to which diffusion takes place of ferrous metal from the core rod into the cladding layer of the clad rod product, it having been found possible to keep the depth of such penetration down below .003 of an inch and preferably below .001 of an inch where the clad rod product or its reduced size derivatives are to be used as electrical conductors. And, the straightness of core rod 12 is such that even during start-up threading and operation it will remain centered in the bore of entry guide 93 and die 31 so that in some instances insert 97, designed to keep graphite from smudging the core rod surface, may be omitted.

Many departures may be made from the illustrated apparatus without exceeding the scope of this invention or of the appended claims. The invention may be used with a wide variety of different core rod metals and a wide variety of different cladding metals including those which have melting points as low, for example, as aluminum and zinc. The core rod may be supplied fully clean and thoroughly straight to a practice of the invention which starts substantially with equipment in the intermediate section at or just ahead of the cladding furnace and its immediately associated equipment. The heating of the core rod may be done indirectly in a muffle furnace instead of using an induction coil heater, or it may be heated directly by flame heating preferably fired in a countercurrent direction to the direction of the movement of the core rod along the passline. While the induction heater 29 above is designed to provide through heating of the core rod to the selected temperature at which it is to enter the cladding furnace, the use of A.C. power of a different frequency may be utilized instead to heat the outer annular portion of the core rod at and adjoining the surface.

While the illustrated feasibility demonstration apparatus produces circular clad rod of full concentricity, other shapes may be provided using a sizing die of different bore shape. Thus, it is believed that the invention is readily applicable to polygonal clad rods and/or cores whose vertices can be circumscribed within a circle and to various other shapes of cladding and/or core, or positional relations of cladding to core. The furnace liner and entry guide may be made of other materials and shapes. The sizing die may be made of other materials and of a different outside shape and without a tail inasmuch as solidification appears complete in the on-size cylindrical entry portion of bore 126. And, as pointed out above, different kinds of treatment may be selected for the portion of the passline following the intermediate section, or in the case of some bimetallics, no treatment at all will be required and the clad rod product will be desired as it is when it leaves the intermediate section, except, possibly, for cooling it down to handling temperature. Further, instead of being coiled at the end of the line by a coiler 53, the clad rod product of this invention may go directly into a multihole drawing machine for drawing the clad rod product to a desired reduced size or sizes, with or without cooling between such drawing machine and the intermediate section, as desired. Or, the clad rod product leaving the intermediate section and any remaining portion of the line selected by a user may go into further processing machinery or mill in accordance with the end product desired from such clad rod. And, various changes may be made in the illustrated feasibility demonstration apparatus within the scope of the invention which is not to be limited except as may be done by the appended claims.

What is claimed is:

1. In a continuous system of cladding a preformed rod core of a higher melting point metal moving along a generally horizontal passline with a lower melting point cladding metal initially in molten condition, the steps comprising, in combination, feeding a coil of said core through a multiplane roller straightener, passing said straightened core through a cleaning device to remove all contaminants from the surface thereof, passing said cleaned core through a second multiplane roller straightener to thoroughly straighten it, roller guiding said cleaned and fully straightened core concentric with said passline into a heating zone, induction heating said core in said heating zone to a selected temperature below the melting point of said cladding metal but sufficient to freeze molten cladding metal thereon and form a regulated extent of diffusion bond with said cladding metal upon direct engagement thereof with molten cladding metal at a selected temperature, sweeping the entire surface of said core in said heating zone with a reducing gas drawn by suction in a direction countercurrent to the direction of movement of said core, guiding said heated cleaned core concentric with said passline through a closely surrounding entry guide into a degasified bath of molten cladding metal, maintaining said bath at a selected temperature in the neighborhood of its melting point without substantial superheat, submerging said heated cleaned core in said bath for a predetermined short distance, freezing a concentric layer of cladding metal of the approximately desired thickness upon said core as it moves through said distance, moving said core directly into an elongated sizing die extending into said bath toward said entry guide to complete the solidification of a predetermined thickness of a concentric cladding layer upon and entirely around said core within said die, said distance being defined by the distance between said entry guide and the entry end of said die, slidably separating said newly-formed cladding layer from the interior of said die to provide a smooth continuous, sized and solid cladding layer concentrically bonded to said core, roller guiding said hot clad core concentric with said passline out of the exit from said die, roller pulling said hot clad core a distance away from said die which will not detrimentally mark said cladding layer with a relatively small and constant force to avoid stretching of said core in said bath and die, said pulling force also extending at least substantially to the entry end of said heating zone to maintain said core precisely straight and concentric with the passline, cooling said clad rod at a distance from said die sufficient to avoid a detrimental metallurgical structure in said clad core, maintaining a predetermined range of slack in said clad core following said pulling device to inhibit interference with said constant force, and coiling said clad core.

2. In a continuous system of cladding a preformed rod core of a higher melting point metal moving along a passline with a lower melting point cladding metal initially in molten condition, the steps comprising, in combination, roller guiding a cleaned and fully straightened core concentric with said passline into a heating zone, heating said core in said heating zone to a selected temperature below the melting point of said cladding metal but sufficient to freeze molten cladding metal thereon and form a diffusion bond with said cladding metal upon direct engagement thereof with molten cladding metal at a selected temperature, sweeping the entire surface of said core in said heating zone with a reducing gas in a direction countercurrent to the direction of movement of said core, guiding said heated cleaned core concentric with said passline through a closely surrounding entry guide into a degasified bath of molten cladding metal, maintaining said bath at a selected temperature, submerging said heated cleaned core in said bath for a predetermined short distance, freezing a concentric layer of cladding metal of the approximately desired thickness upon said core as it moves through said distance, moving said core directly into an elongated sizing die extending into said bath toward said entry guide to complete the solidification of a predeternimed thickness of a concentric cladding layer upon and entirely around said core within said die, roller guiding and pulling said hot clad core concentric with said passline out of the exit from said die, with a relatively small and constant force to avoid stretching of said core in said bath and die, and cooling said clad rod.

3. A continuous system of cladding a preformed metal core rod with a lower melting point cladding metal initially in molten condition, comprising, in combination, pushing a thoroughly straight and clean core rod along a straight horizontal passline, passing said core rod through a heating zone and heating it to a temperature which will fuse molten cladding metal thereon and bond such cladding metal to such core rod, protecting the surface of said core rod at least during said heating to keep it free of contaminants, passing said heated core rod directly into a bath of molten cladding metal for a fraction of a second, preventing molten cladding metal from flowing out of said bath by virtue of the movement of said core rod and the closeness of the parts through which said core rod moves into and out of said bath, freezing a layer of cladding metal concentrically around said core rod while it is moving submerged in said bath, and passing said freezing cladding layer and core rod through a sizing die submerged in said bath to polish wipe the plastic exterior of said freezing cladding layer and provide a clad rod of predetermined external diameter having a predetermined thickness of solidified coherent cladding metal entirely covering said core rod.

4. In a continuous system of cladding as set forth in claim 3, comprising, preferably, moving said core rod along said passline at a rate upwards of 35 feet per minute, said preformed core rod is steel having a diameter approximately .39 of an inch, the temperature to which the steel core is heated in the heating zone while moving is in the neighborhood of 150° F. to 1600° F., exposing said moving steel rod on all sides to molten cladding metal in said bath for a fraction of a second, said cladding metal is copper, the temperature of the molten copper in the bath is in the neighborhood of 2000° F. to 2100° F., freezing copper from said bath concentrically on to and around said steel core to form a solidified cladding layer diffusion bonded to said core and of a radial thickness of about .03 of an inch, hot die smoothing the outside of said cladding layer, and treating said clad rod to provide desired metallurgical properties in said clad rod.

5. A continuous system of cladding a preformed metal core rod with a lower melting point cladding metal initially in molten condition, comprising, in combination, aligning a heating zone, an entry and an exit from a molten cladding metal bath and a pulling device following said bath into a precisely straight and centered rod line, preferably horizontal, passing a thoroughly straight and clean core rod in precisely centered relation along said line, passing said core rod through a heating zone and heating it to a temperature below the melting point of said cladding metal which will bond molten cladding metal thereto and concentrically freeze molten cladding metal in a cladding layer around such core rod, passing said heated core rod directly into a bath of molten cladding metal for a fraction of a second, keeping gas and contaminants out of said bath, freezing a layer of cladding metal concentrically around said core rod while it is submerged in said bath, and passing said freezing cladding layer into a heated sizing die to polish wipe the plastic exterior of said freezing cladding layer to provide a clad rod of predetermined external diameter having a predetermined thickness of solidified cladding metal entirely covering said core rod.

6. A continuous system of cladding as set forth in claim 5, comprising, pulling said clad rod out of said sizing die with a pressure insufficient to detrimentally mark said cladding layer and with a preferably constant force insufficient to neck or stretch said core rod, further pulling said clad rod at a following position remote from said pulling device, causing said clad rod to sag in a downward bow between said position and said pulling device within a predetermined lower sag limit and an upper sag limit to minimize the transmission of forces occasioned by said further pulling through said clad rod to the vicinity of said pulling device.

7. A continuous system of clad as set forth in claim 6, comprising, speeding up said further pulling when said clad rod reaches said lower sag limit and slowing it down when said clad rod reaches said upper sag limit.

8. A continuous system of cladding as set forth in claim 5, comprising, aspirating a protective gas so that it sweeps the entire surface of said core rod in a direction counter to the direction of movement of said core rod along said line, admitting such protective gas in the vicinity of the exit end of said heating zone, and, performing said aspirating in the vicinity of said entry end of said heating zone.

9. A continuous system of cladding as set forth in claim 5, comprising, maintaining said bath with said entry and exit in a cladding furnace, lowering said furnace following said aligning a predetermined distance equal to the expansion in said cladding furnace caused by preheating, preheating said cladding furnace substantially at least to the temperature of said molten cladding metal, and then pouring molten cladding metal thereinto to form said bath.

10. A continuous system of cladding a core comprising a preformed metal rod with a cladding metal having a lower melting point and engaging said core initially in molten condition, comprising, in combination, maintaining a pool of cladding metal in molten condition without substantial superheat, heating said core within a range of temperatures sufficiently below the temperature of said pool to cause said core to concentrically freeze cladding metal against said core to the approximate thickness of cladding desired substantially during the time that said core is in said pool, determining such freezing capacity of said core substantially by its size, thermal conductivity, specific heat and density, and, wiping the plastic surface of said freezing cladding layer with a sizing die substantially at the temperature of said molten cladding metal as said freezing cladding metal and core are leaving said pool.

11. In a continuous system of cladding a preformed core rod of a higher melting point metal moving along a rod line with a lower melting point cladding metal initially in molten condition, the steps comprising, causing a clean, thoroughly straight core rod to enter a heating zone, heating said core rod in said heating zone to a temperature sufficient to cause molten cladding metal to freeze against the surface of said core rod to approximately predeterminable thickness and to effect a relatively predeterminable diffusion between said core rod and frozen cladding layer to bond them together at the interface, moving said heated core rod in precisely centered relation through the bore of an entry guide into a molten pool of cladding metal under the surface thereof, engaging the entire surface of said core rod with a countercurrent flow of protective gas at least in the course of said heating, preventing flow of molten cladding metal out through said entry guide by virtue of the movement of said heated core rod and the closeness of the bore of said guide thereto, lowering the temperature of said molten cladding metal immediately adjoining said core rod submerged in said molten cladding metal bath to freeze a cladding layer thereon of approximately determinable thickness substantially by thermal transfer to said core rod, moving said core rod with said newly-forming cladding layer into the bore of a sizing die projecting into said bath toward said entry guide and in alignment therewith, polish wiping the virtually plastic surface of said freezing cladding layer by means of said bore to size the outside diameter thereof, completing solidification of said cladding layer in said bore of said sizing die, starting the cooling of said solidified cladding layer in said bore, and pulling said hot clad core out of said die for further handling.

12. In a continuous system of cladding a core comprising a preformed metal rod moving along a passline with a cladding metal having a lower melting point and engaging said core initially in molten condition, apparatus comprising, in combination, a pay-out and welder assembly to provide a continuous length of core, a multiplane roller straightener for said core as it is paid out, a grit blaster having at least one cleaning pass for said core to thoroughly clean it, said blaster having dust removal means to inhibit adherence of dust to said clean core, a further multiplane roller straightener for said cleaned core, a roller guide, a tubular induction coil heater having an axial opening therethrough for said core, the entry end of said heater being positioned close to said roller guide, means for passing a protective gas through said axial opening entirely around said core in a direction counter to the direction of movement, a cladding furnace having a passway therethrough aligned with said passline, an entry guide to closely surround said core as it enters said cladding furnace adjacent the exit end of said axial opening, a sizing die on the exit side of said passway having the inner end of said sizing die projecting into the interior of said furnace a predetermined distance toward said entry guide, said furnace interior being adapted to receive molten cladding metal and maintain a pool thereof above said entry guide and sizing die at all times to provide a cladding layer for said core and produce a clad rod which exits hot from said sizing die, a roller guide for said clad rod as close as possible to but spaced from said exit side to avoid marking the cladding layer of said hot clad rod, a torque-controlled roller pulling device for said hot clad core, means for cooling said hot clad rod, means for forming a downward bow sag in said clad rod following said pulling device, means for maintaining said sag between lower and upper limits, and a coiling device for said cooled clad rod, said last-named means operating to speed up said coiling device when said sag reaches its lower limit and to slow down said coiling device when said sag reaches its upper limit.

13. In a continuous system of cladding a core comprising a preformed metal rod moving along a rod line with a cladding metal having a lower melting point and engaging said core initially in molten condition, apparatus comprising, in combination, means to make said core clean and superstraight and move it horizontally at least through an intermediate section of said apparatus where the cladding is performed, a heater having an axial opening therethrough for said core, means for passing a protective gas along said core at least while said core is within said heater, a cladding furnace having a passageway through in alignment with said rod line, an entry guide to closely surround said core as it enters said cladding furnace, a sizing die on the exit side of said passageway having the inner end of said sizing die projecting into the interior of said furnace a predetermined distance toward said entry guide, said furnace interior adapted to receive molten cladding metal and maintain a pool thereof above said entry guide and sizing die at all times to provide a cladding layer for said core and produce a hot clad rod which exits from said sizing die, a roller pulling device for said clad core, means for cooling said clad rod, and a take-up device for said cooled clad rod.

14. In a continuous system of cladding as set forth in claim 13, comprising, said pulling device having two opposed rollers grooved to fit the hot clad rod moving along the rod line, said rollers being parted when in engagement with said clad rod, means for driving said rollers with a relatively constant force insufficient to neck or stretch said core in said hot clad rod, the pressure between said rollers being insufficient to detrimentally mark the cladding on said hot clad rod.

15. In a continuous system of cladding as set forth in claim 13, comprising, means for causing a catenary sag in said clad rod at a selected portion of the rod line following the intermediate section, a slack device having an arm resting upon said clad rod in the sag portion thereof, said take-up device for said clad rod being responsive to said slack device so that said sag is maintained between a predetermined lower limit and a predetermined upper limit, whereby the mass and inertia of said take-up device may be substantially isolated from said intermediate section.

16. A continuous system of cladding as set forth in claim 13, comprising, means for admitting a protective gas to the inner end of said axial opening in said heater substantially at ambient pressure, an aspirator surrounding the outer end of said axial opening, said aspirator having an annular, frusto-conical gas pressure passageway tapering in a direction contrary to the direction of movement of said core, means for admitting a gas under pressure to said frusto-conical passageway to put said protective gas under suction and draw it through said axial opening to sweep the surface of said core in a direction counter to the direction of movement of said core to remove adherent gas and particles from said surface and to place the entry guide under some suction also.

17. A continuous system of cladding a core moving along a rod line and comprising a preformed metal rod moving along a rod line with a cladding metal having a lower melting point and engaging said core initially in molten condition, apparatus comprising, in combination, tubular heating means surrounding said rod line, means for passing protective gas under a positive differential pressure at least through the interior of said heating means in a direction counter to the direction of movement of said core along said rod line to protect said core, a cladding furnace having entry and exit openings along said rod line, an entry guide for said entry opening, means for holding said heating means in substantial abutment to said entry guide, a sizing die for said exit opening, said sizing die having an inner end extending into the interior of said furnace a predetermined distance toward said entry guide, the distance between said sizing die and entry guide being a zone of exposure entirely open all around so that said core will be engaged by molten cladding metal adapted to be in the interior of said cladding furnace, roller guides positioned as closely as possible to the entry end of said heating means and to the exit portion of said sizing die without detriment to said entering core and exiting clad rod moving along said rod line, means for moving said core and clad rod through said heating means, entry die, cladding furnace and sizing die on the rod line, means for aligning said equipment items in a precise straight line before an operation so that rod moving along said rod line will be precisely centered relative to openings in said entry guide, sizing die and roller guides, and universal adjustment means including means to change the height of said rod line across said cladding furnace whereby said cladding furnace when preheated will return into precise alignment under operating conditions.

18. In a continuous system of cladding a core comprising a preformed metal rod moving along a rod line with a cladding metal having a lower melting point and engaging said core initially in molten condition, apparatus comprising, in combination, an induction heater having an axial opening therethrough for a superstraight core moving along said rod line, a cladding furnace having an entry guide to closely surround said core as it enters said cladding furnace and a sizing die to closely surround the clad rod made therein as it leaves said cladding furnace, the inner end of said sizing die projecting into the interior of said furnace a predetermined distance toward but spaced from said entry guide, said furnace interior adapted to receive molten cladding metal and maintain a pool thereof above said entry guide and sizing die at all times to provide a cladding layer for said core and thereby produce a clad rod, means for precisely aligning said entry guide and sizing die with said rod line and moving core, a pulling device, following said sizing die for said clad core, pulling with a force insufficient to stretch said core, and means for further handling said clad rod as it moves along said rod line.

19. In a continuous system of cladding, apparatus comprising, in combination, a cladding furnace having an outside refractory wall, induction heating means in said outside wall, a non-contaminating liner lining the interior of said wall and forming a wholly-enclosed interior adapted to receive molten cladding metal, normally closed drain means positioned in the bottom of said furnace and extending through said liner, means for periodically replenishing the supply of molten cladding metal to said interior while rod moves along said rod line, means to guard against intrusion of air and gas into said interior, entry and exit openings in diametrally opposed relation in the lower portion of said cladding furnace, an entry guide and a sizing die closing said openings respectively, said guide and die each having a precision bore therethrough for said rod line, the bore of said entry guide fitting very closely around said core moving along said rod line leaving an annular clearance insufficient to permit the escape of molten cladding metal during such movement of said core, said sizing die having its inner end extending into the interior of said furnace and terminating a predetermined distance from the inner end of said entry guide, the entry portion of the bore in said sizing die being straight and equal to the outside diameter size of the clad rod desired corrected to the prevailing temperature of the clad rod.

20. A continuous system of cladding as set forth in claim 19, in which, said liner is made of graphite as are said entry guide and sizing die, said bore of said entry guide includes a replaceable cylindrical insert non-smudging as to said core and defining said annular clearance, and said sizing die has a tail portion extending outside said cladding furnace through which said bore continues a slight flare in the direction of movement of said clad rod along said rod line.

21. A continuous system of cladding as set forth in claim 19, comprising, said drain means comprising a plug for the bottom of said furnace, slide and bellcrank plate and lever means for maintaining said plug in place to close the bottom of said furnace, stop means to hold said second-named means in a position holding said drain means closed, means for sliding said second-named means outwardly to enable said plate to be rocked to start the opening of said drain means, and means for sliding said second-named means farther in the same direction to free said drain means from said second-named means so said drain means can drop below the bottom of said furnace.

22. A continuous system of cladding as set forth in claim 19, comprising, a base plate for said cladding furnace rigidly attached to a frame to hold said cladding furnace firmly to said plate, a table adapted to support said base plate, said table having transverse adjustment means to each side of a transverse vertical median plane through said cladding furnace, said transverse adjustment means each comprising a rotatable but not translatable screw, a nut fixed in horizontal and vertical gimbals fixed to said base plate, worm and wormwheel means to rotate said screw to move said base plate transversely relative to said table, said mounting of said nuts in gimbals being effective to permit some horizontal skewing of said cladding furnace to bring it into alignment if needed, a plurality of nuts for vertical adjustment pivotally connected to said table, a vertical screw engaging each of said nuts, said vertical screw being rotatable but not translatable, worm and wormwheel mechanism to turn said vertical screws to move said table, base plate and cladding furnace vertically and to permit some tilting, said vertical adjustment screws and mechanism being mounted in brackets connected by limited movement parallelogram links respectively to a stand, said stand having load cells and senor means whereby to support said brackets, vertical screws and mechanism on which rests the weight of said table, base plate and cladding furnace, whereby said load cells will indicate the quantity of molten cladding metal present in said cladding furnace without any detrimental change in the alignment of said cladding furnace.

23. A continuous system of cladding as set forth in claim 18, in which, said last-named means comprises quench means comprising an outer overflow trough having slotted ends for the passage therethrough of said rod line, an inner immersion trough having slotted ends in registry with the slots in the ends of said overflow trough for the passage of said rod line through said slotted ends of said inner immersion trough, and means for supplying liquid coolant to said inner immersion trough in selected quantities for the cooling or quenching effect desired on clad rod passing therethrough along said rod line.

24. A continuous system of cladding as set forth in claim 18, in which, said last-named means comprises a quench cabinet having slotted ends normally closed by flexible wiper flaps and adapted to have said rod line pass through said slotted ends and flaps, upper and lower spray pipes positioned longitudinally in said cabinet above and below said rod line, and means for supplying selected quantities of liquid coolant to said spray pipes to quench or cool a clad rod moving along said rod line, whereby a desired quenching or cooling effect may be obtained.

No References Cited.

RICHARD H. EANES, JR., *Primary Examiner.*

UNITED STATES PATENT OFFICE
CERTIFICATE OF CORRECTION

Patent No. 3,281,918                        November 1, 1966

Francis E. Leib et al.

It is hereby certified that error appears in the above numbered patent requiring correction and that the said Letters Patent should read as corrected below.

Column 10, line 59, for "copperclad" read -- copper-clad --; column 11, line 32, for "surface" read -- furnace --; column 12, line 12, for "and" read -- the --; column 14, line 29, for "alternatety" read -- alternately --; line 37, for "shilled" read -- chilled --; column 18, line 61, for "predeternimed" read -- predetermined --; column 19, line 22, for "150° F." read -- 1550° F. --; column 24, line 16, for "senor" read -- sensor --;

Signed and sealed this 5th day of September 1967.

(SEAL)
Attest:

ERNEST W. SWIDER
Attesting Officer

EDWARD J. BRENNER
Commissioner of Patents